United States Patent
Coronado et al.

(10) Patent No.: US 7,574,529 B2
(45) Date of Patent: Aug. 11, 2009

(54) ADDRESSING LOGICAL SUBSYSTEMS IN A DATA STORAGE SYSTEM

(75) Inventors: Juan A Coronado, Tucson, AZ (US); Bret W Holley, Tucson, AZ (US); Lawrence C Blount, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 927 days.

(21) Appl. No.: 10/874,160

(22) Filed: Jun. 22, 2004

(65) Prior Publication Data

US 2005/0283538 A1    Dec. 22, 2005

(51) Int. Cl.
G06F 13/00    (2006.01)

(52) U.S. Cl. ...................... 709/245; 709/238

(58) Field of Classification Search .......... 709/245, 709/238, 217

See application file for complete search history.

(56) References Cited

U.S. PATENT DOCUMENTS

| | | | |
|---|---|---|---|
| 5,555,371 A | 9/1996 | Duyanovich | |
| 5,640,603 A | 6/1997 | Meritt et al. | |
| 7,143,176 B2 * | 11/2006 | Gluck et al. | 709/217 |
| 2003/0088638 A1 | 5/2003 | Gluck et al. | |

* cited by examiner

*Primary Examiner*—Kenneth R Coulter
(74) *Attorney, Agent, or Firm*—Dan Shifrin

(57) ABSTRACT

A method for transferring data over a network operating in accordance with a protocol, such as the ESCON protocol, that supports a limited logical address range includes establishing a logical path over the network from a host or other device to a second device, such as a storage system, using path logical addresses within the given logical address range. A virtual path is created over the logical path to carry the data from the source to the target, wherein the target logical subsystem has a subsystem logical address which is outside the given logical address range.

32 Claims, 4 Drawing Sheets

| Logical Path Table | | | | |
|---|---|---|---|---|
| Path Number | Channel Physical Address | Channel Logical Address | CU Logical Address | CU Virtual LSS |
| 0 | 0 x 0F | 01 | 02 | 25 |
| 1 | 0 x 0F | 02 | 03 | 47 |
| 2 | 0 x B0 | 00 | 00 | 00 |
| 3 | 0 x DE | 0 x 0F | 0 x 0E | 127 |
| . | . | . | . | . |
| . | . | . | . | . |
| . | . | . | . | . |

ADDRESSING LOGICAL SUBSYSTEMS IN A DATA STORAGE SYSTEM

TECHNICAL FIELD

The present invention relates generally to data storage systems and, in particular, to allowing access to a greater range of logical storage subsystems.

BACKGROUND ART

Large-scale computer storage systems typically comprise multiple arrays of storage devices. An example of such as system is the IBM Enterprise Storage Server® (ESS), sold by IBM Corporation of Armonk, N.Y. The ESS comprises a control unit (CU), typically made up of a cluster of microprocessors, having a cache memory and non-volatile storage. The controller supports one or more logical subsystems (LSS) or control unit images, each of which comprises an array of storage volumes, typically made up of magnetic disks.

The Enterprise Systems Connection Architecture® (ESCON®) standard was defined by IBM® to enable reliable, high-speed serial data transfer over long distances between host processors and storage systems. ESCON is described in IBM publication SA22-7202-02, entitled Enterprise Systems Architecture/390: ESCON I/O Interface (IBM Corporation, Armonk, N.Y., 1992), which is incorporated herein by reference. ESCON specifies two levels of protocols: the link level and the device level. The link level describes the physical characteristics of a channel path (between a host and storage subsystem), along with the associated protocols required for the transmission and reception of frames over the path. The device level relates primarily to the protocols associated with the execution of an input/output (I/O) operation for a specific I/O device.

ESCON link-level addressing provides an eight-bit link address for each storage system CU, with a four-bit logical (port) address extension identifying an LSS. The combination of the link address and logical extension is referred to as a logical address. Since the logical address extension is four bits long, up to 16 LSSs are supported, at logical addresses 0 through 15, in each CU in the ESCON network. Each data frame transmitted over an ESCON link has a link header that specifies the link address and logical address of the source and destination of the frame.

Following the header, each link frame contains an information field. When the link frame is a device frame (i.e., a link frame relating to a specific device I/O operation), the information field contains a device header and a device information block. The device header includes an eight-bit device address; thus, up to 256 storage devices can be attached to a given LSS. The information field can carry commands, data, control information and status. The commands are normally specified by a chain of Channel Command Words (CCWs) provided by the I/O program being executed in "count, key, data" (CKD) format. CKD is the disk architecture used in IBM S/390® systems and allows data records to be of variable size (count). A command to write to a given target storage volume is followed by a sequence of one or more data frames containing the data to be written. Typically, the system to which the data were written returns a status frame describing the results of the completion of the I/O operation (success or failure).

To write data to a target storage volume, the channel subsystem of the host (i.e., the host I/O interface) selects the physical and logical link addresses of the corresponding LSS and the device address of the volume and submits a chain of one or more CCWs. An ESCON channel path, called a logical path, is set up between the channel subsystem and the addressed LSS. To write data to a target storage volume, the channel subsystem of the host (i.e., the host I/O interface) selects an available logical path that connects it to the target LSS and sends the chain of CCWs to the desired target volume, indicated by the device address. Thus, selection of the logical path determines the source and target LSSs, while the device address determines to which device in the target LSS the I/O will be directed. The logical path may be used exclusively for data transfer between the host and the specified storage device until the chain is completed. This type of channel use is referred to as "selector" mode, as opposed to "multiplexer" mode, which enables sharing of the link by several chains, each using a different logical path established over the link. At the completion of the chain, the storage device returns an "ending status" indication, and the channel path is released.

Data backup is a standard part of all large-scale computer data storage systems (and most small systems, as well). Data written to a primary storage medium, such as a volume on a local storage subsystem, are copied to a backup medium, typically another volume on a remote storage subsystem, which can then be used for recovery in case a disaster causes the data on the primary medium to be lost. A number of different copy service functions of the ESS exist that can be used for this purpose. Among these functions is peer-to-peer remote copy (PPRC) in which a mirror copy of a source volume on a primary storage subsystem is created on a secondary storage subsystem. PPRC is implemented using a direct ESCON link between the primary and secondary subsystems, both residing in respective CUs (as opposed to the host-to-CU type of ESCON link described previously). When an application on a host processor writes to a PPRC volume on the primary subsystem, the corresponding data updates are entered into cache memory and non-volatile storage at the primary subsystem. The CU of the primary subsystem then sends the updates over the link to the secondary subsystem, using the data link and device level protocols described above. When the secondary subsystem has placed the data in its own cache and non-volatile storage, it acknowledges receipt of the data, and the primary subsystem then signals the application that the write operation is complete.

Many disks and disk systems do not support the CKD format specified by ESCON, but rather comply with the Small Computer System Interface (SCSI) standard. SCSI devices are addressed using "Write Fixed Block Data" commands. These commands are similar in form to CKD commands, but not, identical. The SCSI command set is described in standard X3.131:1994 of the American National Standards Institute (ANSI—Washington, D.C.). Among other differences, data can be written to SCSI devices only in blocks of fixed size, rather than in variable-size records as supported by CKD. Current-generation storage systems, such as the above-mentioned IBM ESS, allow both CKD and SCSI devices to be connected to and controlled by the same CU. However, in order to comply with the ESCON link-level and device-level protocols, LSS0 through LSS15 must contain only CKD devices. Higher LSS addresses (LSS16 and up) can be used for SCSI devices. Because ESCON provides only a four-bit logical address, however, there is currently no straightforward way of addressing any LSS above LSS15 over an ESCON link while maintaining full compliance with the ESCON protocols. This limitation interferes with the possibility of carrying out PPRC operations between SCSI disks over ESCON links.

LSSs may also be attached to host or other devices through another IBM-developed architecture, Fiber Channel Architecture (FICON®). In FICON, an eight-bit logical address extension identifies each LSS. Since the logical address extension is eight bits long, up to 256 LSSs may be supported, at logical addresses 0 through 255, in each CU in the FICON network. Again, however, because ESCON provides only a four-bit logical address, it is not currently possible to access LSSs in the range above LSS15 to which data has been written through a FICON link while maintaining full compliance with the ESCON protocols. Nor is it possible to access LSSs in the range above LSS255 through a FICON link while maintaining full compliance with the FICON protocols.

SUMMARY OF THE INVENTION

The present invention provides systems and methods for transferring data over a network operating in accordance with a protocol, such as the ESCON protocol, that supports a limited logical address range (for example, 0-n). A device coupled to the network, such as a storage system, includes a control unit having a plurality of logical storage subsystems (LSSs), each with a logical address within a range which may extend beyond the limited logical address range.

A logical path is established over the network between a host or other device and a second device, such as a storage system, using path logical addresses within the limited logical address range. A virtual path is also created over the logical path to carry data from the source to the target. To accommodate those target LSSs having addresses outside the limited logical address range, a configuration data structure is established in which up to n virtual LSSs (VLSS) are identified by both a VLSS number and a corresponding LSS number. The VLSS number is stored in a logical path data structure with link addresses of the host device and the control unit. When a command from the host device is received by the control unit to perform an I/O operation with a specified LSS, the operation will be performed by the LSS having the VLSS number corresponding to the specified LSS number.

BRIEF DESCRIPTION OF THE DRAWINGS

FIG. 5 illustrates an exemplary logical path data structure of the present invention.

DETAILED DESCRIPTION OF THE PREFERRED EMBODIMENT

Figure 1:
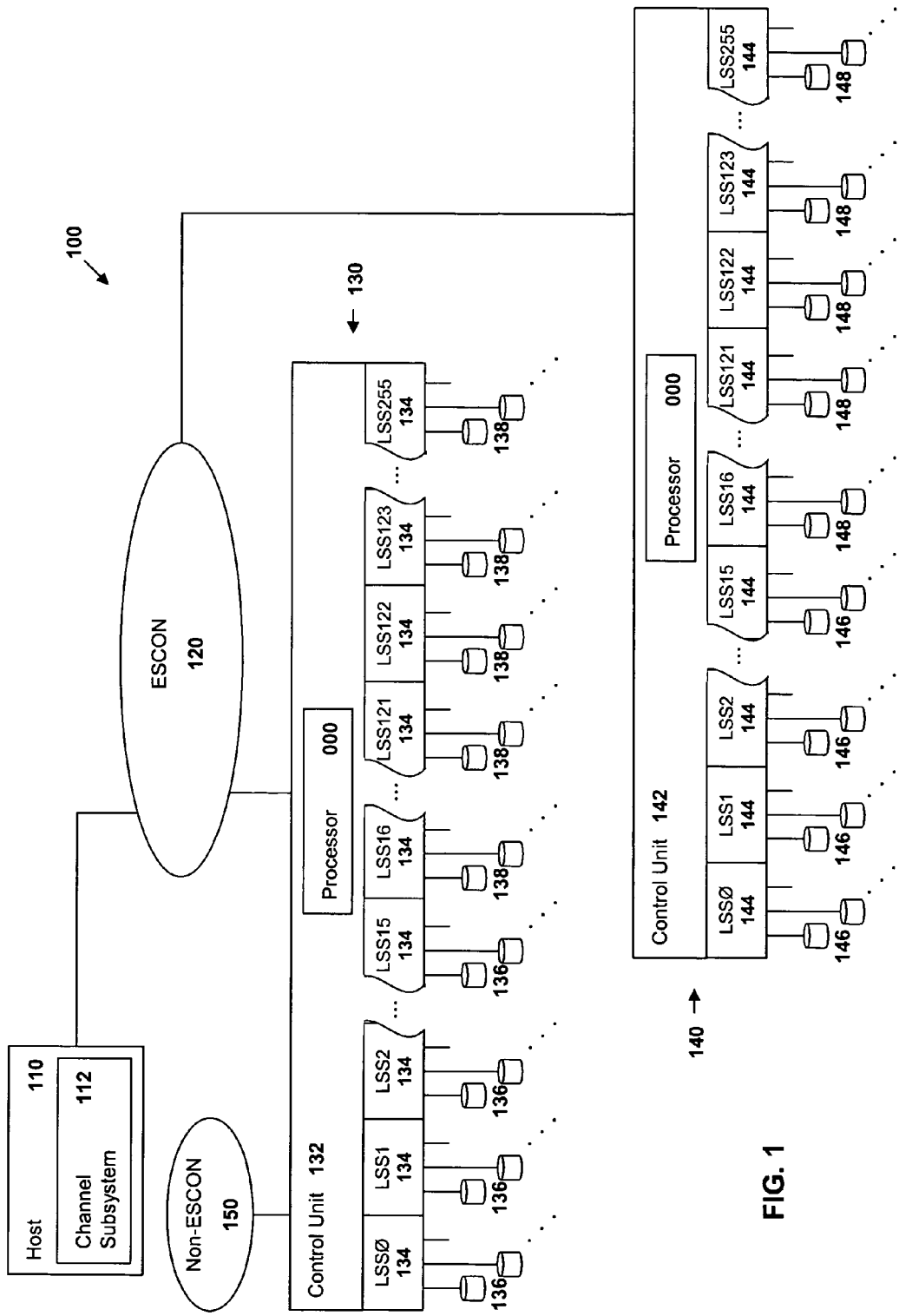
FIG. 1 is a block diagram of a data storage system of the present invention.

FIG. 1 is a block diagram of a data processing system 100 of the present invention. A host device 110, typically a general-purpose computer such as an IBM S/390®, writes data to be stored via an I/O adapter, which is a part of a channel subsystem 112 such as an IBM ESA/390. The data are conveyed via a storage network 120 to a storage system 130. The network 120 may comprise fiberoptic links and switches (not shown), as are known in the art, operating in accordance with the Enterprise Systems Connection Architecture (ESCON) standard. The storage system 130 comprises a control unit (CU) 132, which controls a plurality of logical subsystems (LSSs) 134. Because of the FICON and SCSI addressing protocols in which each LSS is addressed by an 8-bit number, the control unit 132 may define up to $2^8=256$ such subsystems. The CU 132 itself typically comprises a central processing unit or one or more, and preferably two, clusters of computer processors. Each LSS 134 comprises an array of storage devices, comprising disks which are presented to the host 110 as CKD disks 136 or fixed-block disks 138 (which are typically FICON or SCSI-compatible disks). In accordance with the ESCON protocol in which each LSS is addressed by an 4-bit number, the first $2^4=16$ LSSs, LSS0 through LSS15, must comprise CKD disks. Devices on LSSs in the range of LSS16 and above comprise fixed-block disks or CKD devices.

In many configurations of the data processing system 100, data written to the storage system 130 are backed up on a second storage system 140. The second storage system 140, like the first system 130, comprises a control unit (CU) 142 and a plurality of LSSs 144. CKD disks 146 and fixed-block disks 148 are arrayed in the LSSs 144 in the manner described above with reference to the first storage system 130. The data backup is preferably made using a PPRC service to copy all data written to designated disks 136 and 138 on the first system 130 over the network 120 to the secondary disks on the second system 140.

The commands, data and status responses associated with the PPRC service are carried over the network in accordance with the ESCON protocol. A virtual path, which is a clone of the logical path, is created for each relation of a primary LSS to a secondary LSS. In the case of CKD LSSs, between LSS0 and LSS15, a single virtual path is cloned to the logical path. For fixed-block LSSs, all the virtual paths are mapped to logical paths connecting primary LSS0 to secondary LSS0, so that many virtual paths are mapped onto a single logical path. Since the logical path is used in "selector" mode, as described above, only one virtual path may be used at any given instant, implying exclusive use of the logical path to which it is mapped. The virtual path is uniquely associated with the source and target LSSs and the target device for the PPRC operation. When the second CU 142 receives ESCON device frames, it always uses the logical address (i.e., the secondary LSS and secondary device number) embedded in the CCW parameter list. The virtual path mechanism thus allows PPRC operations to take place between both CKD and fixed-block devices on the first and second storage systems 130 and 140.

The operations of the host 110 and of the CUs 132 and 142 are typically carried out by the respective processors under the control of software, Such software may be provided on tangible media, such as CD-ROM.

Figures 2, 4:
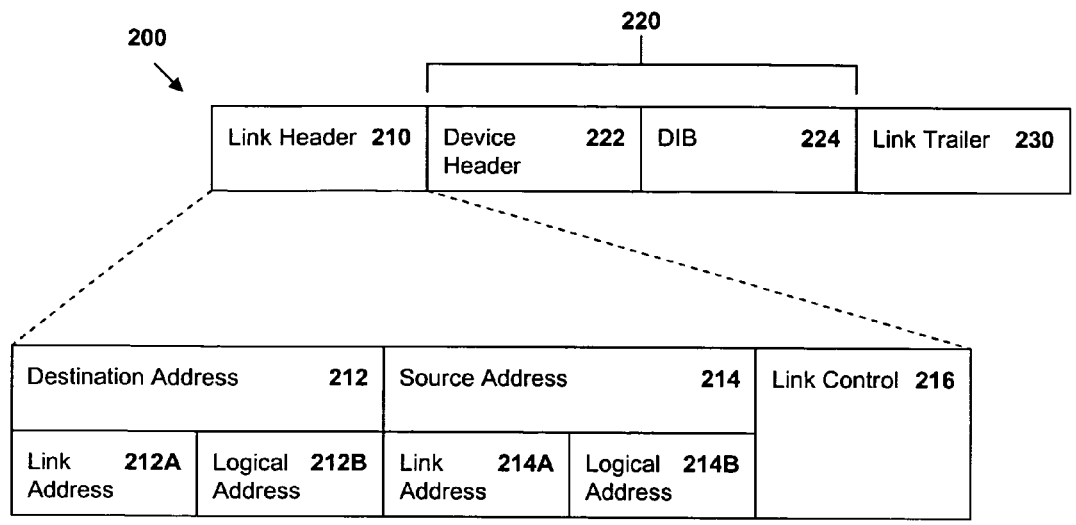
FIG. 2 illustrates an exemplary data frame transmitted over an ESCON link.
FIG. 4 illustrates an exemplary configuration data structure of the present invention.

FIG. 2 is a block diagram which schematically illustrates the structure of a device data frame 200, used in implementing a preferred embodiment of the present invention. In accordance with the ESCON standard, the frame 200 comprises a link header 210, an information field 220 and a link trailer 230. The link header comprises a destination address 212, a source address 214 and a link control field 216. The destination and source addresses 212 and 214 both comprise a link address 212A, 214A and a logical address 212B, 214B. The link address 212A, 214A is eight bits long and identifies the host channel subsystem 112 or another attached subsystem, such as the primary storage system 130 as the source of the link and the secondary storage system 140 or another attached system as the destination. For return communications from the destination to the source, such as status frames indicating the completion status of an operation, the source and destination addresses are, of course, reversed. The logical address 212B, 214B is four bits long and identifies the LSS corresponding to the source LSS and the destination LSS of the logical channel path.

The information field 220 comprises a device header 222 and a device information block (DIB) 224. Normally, the device header 222 comprises an eight-bit device address, indicating the identity of the target device for the data operation, along with certain flags, as specified in the ESCON standard. These flags include information field identifier (IFI) flags, indicating the type of this device frame (command, data, status or control), and device header flags (DHF), used to control the execution of I/O operations.

Figure 3:
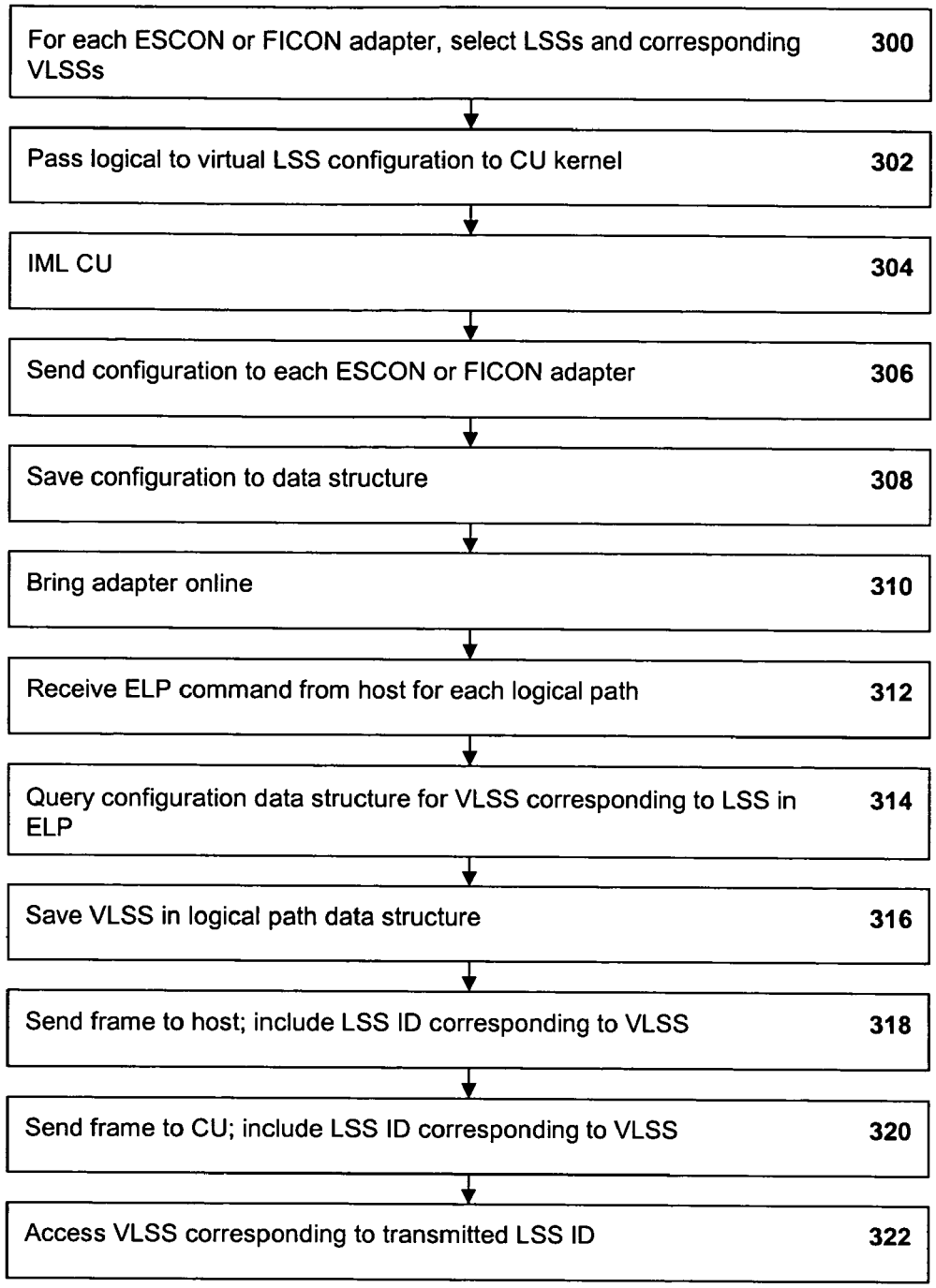
FIG. 3 is a flow chart of a method of accessing logical subsystems in accordance with the present invention.

The flow chart of FIG. 3 illustrates a method for carrying out an embodiment of the present invention in which the frame data structures described above with reference to FIG. 2 are used. To configure the storage system 130 to access LSS outside of the conventional range of 0-15, for each ESCON adapter the system administrator selects up to 16 LSSs of the up to 256 defined LSSs (300). The administrator also selects an LSS number (0-15) for each. After this configuration information has been entered, the information is passed to the kernel of the operating system of the CU 130 (302). When an initial microcode load (IML) operation of the CU 130 is commenced (304), the kernel sends the configuration information to each ESCON adapter (306) and also saves the configuration to a configuration data structure (308), such as a table or array. FIG. 4 illustrates an exemplary configuration data structure 400 having two elements. A first element identifies a selected VLSS 402 while a second element identifies the port or LSS number 404 assigned to the VLSS. Thus, in the data structure of FIG. 4, VLSS numbers 1, 4, 15, 72, 123 and 246 have been selected to be accessible through the CU 130 (for clarity, another 9 possible VLSSs are not included in the data structure). LSS numbers 0, 1, 2, 3, 14 and 15 have been assigned, respectively, to the VLSSs.

When an adapter is subsequently brought online (310), the host device 110 sends a conventional Establish Logical Path (ELP) command for each logical path it seeks to establish (312). Within the ELP are the addresses of the LSS (0-15) and the logical path. During ELP processing, the adapter firmware/microcode sends an inquiry to the operating system requesting the identification of the VLSS corresponding to the LSS (314). The VLSS number is then stored in a logical path data structure, such as a table or array, along with the link addresses of the host channel subsystem 112 and the control unit 130, thereby fully defining the logical path (316). An exemplary logical path data structure is illustrated in FIG. 5. The logical path data structure provides the information necessary to send frames back to the proper host (requiring both the physical and logical addresses) as well as the control unit logical address to which the frame was sent. The CU Virtual LSS is the mapping to the LSS on the control unit on which the operation will actually be processed.

When a frame is to be sent to the host device 110, the LSS number corresponding to the VLSS will be used (318). Similarly, when a frame is sent from the host 110 to the CU 130, the LSS number will be used (320) and the logical path table will be queried for the corresponding VLSS. The present invention now provides access to previously inaccessible LSSs, to which data may have been written through a non-ESCON network 150 (FIG. 1), such as FICON.

While the embodiment described herein is directed specifically to an ESCON environment, the principles of the present invention may be applied to other data storage environments, such as FICON. Up to $2^8=256$ LSSs may be addressed in a FICON network. However, in a manner similar to that described herein with respect to ESCON, the present invention permits access to $2^9=512$ virtual LSSs.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method executing in a processor for managing logical paths in a data storage system, comprising:
    providing up to $2^y$ logical subsystems (LSS), each LSS having a y-bit virtual LSS (VLSS) number;
    selecting up to $2^x$ of the LSSs to be assigned to a host adapter in a control unit, each selected LSS being addressable in a first network by an x-bit LSS number, where x<y;
    for each selected LSS, assigning an LSS number;
    storing in a configuration data structure in the control unit the assigned LSS number of each selected LSS with the corresponding assigned VLSS number;
    receiving in the control unit a request from an attached host device to establish a logical path between the host device and one or more of the selected LSSs;
    storing in a logical path data structure in the host adapter the VLSS number of each LSS for which a logical path is to be established;
    storing in the logical path data structure link addresses of the requesting host device and of the control unit;
    receiving in the control unit a command transmitted by the host device to perform an I/O operation with a first LSS identified in the command by its LSS number; and
    performing the I/O operation by the LSS having the VLSS number corresponding to the LSS number.

2. The method of claim 1, wherein the first network comprises an ESCON network and x=4.

3. The method of claim 2, wherein each LSS is further addressable in a second network by a y-bit LSS number.

4. The method of claim 3, wherein the second network comprises a FICON network and y=8.

5. The method of claim 1, wherein the first network comprises a FICON network and x=8.

6. A data storage control unit, comprising:
    an I/O interface adapter of a first type attached to a host channel subsystem through a physical channel path, the host channel subsystem addressable by a link address and a logical address;
    a plurality of logical subsystems (LSS), each identifiable by a y-bit virtual LSS (VLSS) number and each addressable by a link address and an x-bit logical LSS number, where x<y;
    at least one interface to which at least one storage device is attached, each of the at least one storage device assignable to an LSS;
    means for assigning up to $2^x$ VLSSs to the adapter;
    a configuration data structure stored in the data storage control unit identifying each assigned VLSS by a corresponding LSS number;
    means for receiving an Establish Logical Path (ELP) command from the host channel subsystem, the ELP command identifying an assigned LSS by an LSS number;
    means for obtaining from the configuration data structure the VLSS number corresponding to the assigned LSS number; and a logical path data structure stored in the I/O interface adapter associating the VLSS number with link addresses of the host channel and the control unit;

whereby, a command transmitted by the host channel to the control unit to perform an I/O operation with a first LSS identified in the command by its LSS number will be performed by the LSS having the VLSS number corresponding to the LSS number.

7. The data storage control unit of claim 6, wherein the I/O interface adapter of the first type comprises an ESCON interface adapter and x=4.

8. The data storage control unit of claim 7, wherein each LSS is further addressable in a second network by a y-bit LSS number.

9. The data storage control unit of claim 8, wherein the I/O interface adapter of the first type comprises a FICON interface adapter and y=8.

10. The data storage control unit of claim 6, wherein the I/O interface adapter of the first type comprises a FICON interface adapter and x=8.

11. A data storage system, comprising:

a control unit attached to a network, the control unit having a link address and at least one host adapter;

a plurality of logical subsystems (LSS), each LSS being assignable to the control unit and being addressable in a first network by an x-bit LSS number and each having a y-bit virtual LSS (VLSS) number, y>x;

one or more data storage devices assignable to each LSS for storing data transmitted by a host device attached to the network;

means for assigning up to $2^x$ VLSSs to the at least one host adapter; and a configuration data structure stored in the control unit identifying each assigned VLSS by a corresponding LSS number;

the control unit being configured to:

receive an Establish Logical Path (ELP) command from the host device, the ELP command identifying an assigned LSS by an LSS number;

obtain from the configuration data structure the VLSS number corresponding to the assigned LSS number; and store the corresponding VLSS number in a logical path data structure in the at least one host adapter associating the VLSS number with link addresses of the host device and the control unit;

whereby, a command transmitted by the host device to the control unit to perform an I/O operation with a first LSS identified in the command by its LSS number will be performed by the LSS having the VLSS number corresponding to the LSS number.

12. The system of claim 11, wherein the first network comprises an ESCON network and x=4.

13. The system of claim 12, wherein each LSS is further addressable in a second network by a y-bit LSS number.

14. The system of claim 13, wherein the second network comprises a FICON network and y=8.

15. The system of claim 11, wherein the first network comprises a FICON network and x=8.

16. A method executing in a processor for accessing data stored in a logical subsystem of a data storage system, comprising:

receiving in a host adapter in a storage control unit an I/O request having a designated logical subsystem (LSS) destination, the designated LSS identified by an x-bit LSS number;

translating in the host adapter the LSS number into a y-bit virtual LSS (VLSS) number, where y<x;

accessing the designated LSS corresponding to the VLSS number through an established logical path;

selecting from up to $2^y$ LSSs, up to $2^x$ LSSs to be assigned to the host adapter, each of the up to $2^y$ LSSs being identified by a y-bit VLSS number;

assigning an x-bit LSS number to each selected LSS;

storing in a configuration data structure in the storage control unit the x-bit LSS number of each selected LSS with the corresponding y-bit VLSS number;

receiving in the storage control unit an Establish Logical Path (ELP) command from an attached host channel subsystem, the ELP including an LSS number;

querying the configuration data structure to obtain the VLSS number corresponding to the LSS number;

storing the VLSS number of each assigned LSS in a logical path data structure in the host adapter with addresses of other elements of the established logical path; and translating the LSS number by obtaining the VLSS number from the logical path data structure.

17. The method of claim 16, wherein the logical subsystem is attached to an ESCON network and x=4.

18. The method of claim 17, wherein each LSS is further addressable in a second network by the y-bit VLSS number.

19. The method of claim 18, wherein the second network comprises a FICON network and y=8.

20. The method of claim 16, wherein the logical subsystem is attached to a FICON network and x=8.

21. A logical path management system, executing in a processor, in a data storage system, comprising:

means in a host adapter in a storage control unit for receiving an I/O request having a designated logical subsystem (LSS) destination, the designated LSS identified by an x-bit LSS number;

means in the host adapter for translating the LSS number into a y-bit virtual LSS (VLSS) number, where y<x;

means in the storage control unit for accessing the designated LSS corresponding to the VLSS number through an established logical path;

means for selecting from up to $2^y$ LSSs, up to $2^x$ LSSs to be assigned to the host adapter, each of the up to $2^y$ LSSs being identified by a y-bit VLSS number;

means for assigning an x-bit LSS number to each selected LSS;

means for storing in a configuration data structure in the storage control unit the x-bit LSS number of each selected LSS with the corresponding y-bit VLSS number following assigning the x-bit LSS number;

means for receiving in the storage control unit an Establish Logical Path (ELP) command from an attached host channel subsystem, the ELP including an LSS number;

means for querying the configuration data structure to obtain the VLSS number corresponding to the LSS number;

means for storing the VLSS number of each assigned LSS in a logical path data structure in the host adapter with addresses of other elements of the established logical path; and means for translating the LSS number by obtaining the VLSS number from the logical path data structure.

22. The system of claim 21, wherein the logical subsystem is attached to an ESCON network and x=4.

23. The system of claim 22, wherein each LSS is further addressable in a second network by the y-bit VLSS number.

24. The system of claim 23, wherein the second network comprises a FICON network and y=8.

25. The system of claim 21, wherein the logical subsystem is attached to a FICON network and x=8.

26. A computer program product of a computer readable storage medium usable with a programmable computer, the computer program product having computer-readable code embodied therein for managing logical paths in a data storage system, the computer-readable code comprising instructions for:

selecting up to $2^x$ of up to $2^y$ logical subsystems (LSS) to be assigned to a host adapter in a storage control unit, each of the up to $2^y$ LSSs having a y-bit virtual LSS (VLSS) number and each selected LSS being addressable in a first network by an x-bit LSS number, where x<y;

for each selected LSS, assigning an LSS number between 0 and x;

storing in a configuration data structure in the storage control unit the assigned LSS number of each selected LSS with the corresponding assigned VLSS number;

receiving in the storage control unit a request from an attached host device to establish a logical path between the host device and one or more of the selected LSSs;

storing in a logical path data structure in the host adapter the VLSS number of each LSS for which a logical path is to be established;

storing in the logical path data structure link addresses of the requesting host device and of the control unit;

receiving in the storage control unit a command transmitted by the host device to the control unit to perform an I/O operation with a first LSS identified in the command by its LSS number; and performing the I/O operation by the LSS having the VLSS number corresponding to the LSS number.

27. The computer program product of claim 26, further comprising instructions for:

selecting from up to $2^y$ LSSs, up to $2^x$ LSSs to be assigned to the host adapter, each of the up to $2^y$ LSSs being identified by a y-bit VLSS number; assigning an x-bit LSS number to each selected LSS;

storing the VLSS number of each assigned LSS in a logical path data structure in the host adapter with addresses of other elements of the established logical path; and translating the LSS number by obtaining the LSS number from the logical path data structure.

28. The computer program product of claim 27, further comprising instructions for, following assigning the x-bit LSS number:

storing in a configuration data structure in the storage control unit the x-bit LSS number of each selected LSS with the corresponding y-bit VLSS number;

receiving in the storage control unit an Establish Logical Path (ELP) command from an attached host channel subsystem, the ELP including an LSS number; and querying the configuration data structure to obtain the VLSS number corresponding to the VLSS number.

29. The computer program product of claim 26, wherein the logical subsystem is attached to an ESCON network and x=4.

30. The computer program product of claim 29, wherein each LSS is further addressable in a second network by the y-bit VLSS number.

31. The computer program product of claim 30, wherein the second network comprises a FICON network and y=8.

32. The computer program product of claim 26, wherein the logical subsystem is attached to a FICON network and x=8.

* * * * *